United States Patent
Spehl

(10) Patent No.: US 10,187,103 B2
(45) Date of Patent: Jan. 22, 2019

(54) MOTOR VEHICLE HAVING A PLURALITY OF ANTENNAS AND AT LEAST ONE COMMUNICATION DEVICE

(71) Applicant: AUDI AG, Ingolstadt (DE)

(72) Inventor: Jürgen Spehl, Wettstetten (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/765,096

(22) PCT Filed: Sep. 27, 2016

(86) PCT No.: PCT/EP2016/001606
§ 371 (c)(1),
(2) Date: Mar. 30, 2018

(87) PCT Pub. No.: WO2017/059947
PCT Pub. Date: Apr. 13, 2017

(65) Prior Publication Data
US 2018/0269915 A1 Sep. 20, 2018

(30) Foreign Application Priority Data
Oct. 6, 2015 (DE) .................. 10 2015 012 893

(51) Int. Cl.
*H04M 1/00* (2006.01)
*H04B 1/3822* (2015.01)
(Continued)

(52) U.S. Cl.
CPC ......... *H04B 1/3822* (2013.01); *H04B 1/0032* (2013.01); *H04B 1/48* (2013.01);
(Continued)

(58) Field of Classification Search
CPC ...... H04B 1/3822; H04B 1/0032; H04B 1/48; H04B 7/0413; H04B 7/0615; H04B 7/0802; H04B 7/0837; H04M 9/082
(Continued)

(56) References Cited

U.S. PATENT DOCUMENTS

| 2014/0044026 A1 | 2/2014 | Troemel, Jr. |
| 2014/0153674 A1 | 6/2014 | Stratigos, Jr. |
| 2014/0243033 A1 | 8/2014 | Wala et al. |

FOREIGN PATENT DOCUMENTS

| CN | 103974340 A1 | 8/2014 |
| DE | 102015012893.0 | 10/2015 |

(Continued)

OTHER PUBLICATIONS

Opposition to the Published Patent Application for German Application No. 10 215 012 888.4 dated Nov. 9, 2017.
(Continued)

*Primary Examiner* — Sanh D Phu
(74) *Attorney, Agent, or Firm* — Staas & Halsey LLP

(57) ABSTRACT

At least one communication service for transmitting and/or receiving information associated with the communication service utilizes at least one of several antennas in a motor vehicle. An antenna circuit, associated with each of the antennas, converts an analog signal received by the antenna into digital received data associated with that antenna circuit and/or converts digital transmission data associated with that antenna circuit into an analog transmission signal which is supplied to the associated antenna. A communication device in the motor vehicle generates transmission data associated with the antenna circuits in accordance with transmission information and transfers the transmission data to the associated antenna circuit and receives the digital received data
(Continued)

from at least one of the antenna circuits to provide reception information based on the digital received data.

20 Claims, 4 Drawing Sheets

(51) Int. Cl.
  *H04B 1/00* (2006.01)
  *H04B 7/0413* (2017.01)
  *H04B 7/08* (2006.01)
  *H04B 1/48* (2006.01)
  *H04B 7/06* (2006.01)
  *H04M 9/08* (2006.01)
  *H04L 12/40* (2006.01)

(52) U.S. Cl.
  CPC ......... *H04B 7/0413* (2013.01); *H04B 7/0615* (2013.01); *H04B 7/0802* (2013.01); *H04B 7/0837* (2013.01); *H04M 9/082* (2013.01); *H04L 2012/40273* (2013.01)

(58) Field of Classification Search
  USPC ..................................................... 455/569.2
  See application file for complete search history.

(56) References Cited

FOREIGN PATENT DOCUMENTS

| EP | 0 924 864 A2 | 6/1999 |
| EP | 1 231 672 A2 | 8/2002 |
| WO | 02/052774 A2 | 7/2002 |
| WO | PCT/EP2016/001606 | 9/2016 |

OTHER PUBLICATIONS

English Translation by WIPO of the International Preliminary Examination Report on Patentability for PCT/EP2016/001606 dated Apr. 12, 2018.
Gründen-Live 2015: Systematische Parkplatz Information (SPI) obtained from www.gruenden-live.de/ideenwettewerb/6/2278; dated Aug. 4, 2015; pp. 1-5.
Office Action dated Jul. 4, 2016 in German Patent Application 10 2015 012 893.0; 12 pp.
International Search Report dated Dec. 22, 2016 in PCT/EP/2016/001606.
International Preliminary Report on Patentability dated Jan. 24, 2018 in PCT/EP/2016/001606.
Chinese Office Action for Chinese Application No. 201680059174.2 dated Oct. 8, 2018.

MOTOR VEHICLE HAVING A PLURALITY OF ANTENNAS AND AT LEAST ONE COMMUNICATION DEVICE

CROSS REFERENCE TO RELATED APPLICATIONS

This application is the U.S. national stage of International Application No. PCT/EP2016/001606, filed Sep. 27, 2016 and claims the benefit thereof. The International Application claims the benefit of German Application No. 10 2015 012 893.0 filed on Oct. 6, 2015, both applications are incorporated by reference herein in their entirety.

BACKGROUND

Described below is a motor vehicle having multiple antennas and at least one communication device that is configured to provide at least one communication service for sending transmission information associated with the respective communication service and/or for receiving received information associated with the respective communication service via in each case at least one of the antennas for a user and/or at least one further motor vehicle component, wherein the motor vehicle has, for each of the antennas, an associated antenna circuit that is used for converting an analog received signal received from the antenna into digital received data associated with the respective antenna circuit and/or for converting digital transmission data associated with the respective antenna circuit into an analog transmission signal supplied to the associated antenna, wherein the communication device is configured to send the transmission information by generating the transmission data associated with at least one of the antenna circuits on the basis of the transmission information and transmitting the transmission data to the respectively associated antenna circuit and to receive a piece of received information by receiving the received data associated with the antenna circuit or at least one further instance of the antenna circuits and providing the received information on the basis of the received data, wherein the communication device is configured to take an operating parameter of the communication device as a basis for selecting one or more of the antennas for sending the transmission information and/or for receiving the received information, the number of antennas used by the communication service being variable over time.

In motor vehicles, a multiplicity of communication services need to be provided. Firstly, communication devices, for example mobile radio devices integrated in the vehicle, need to be provided for users. Secondly, a multiplicity of assistance systems send or receive information. By way of example, multiple antennas need to be used to receive GPS signals, and some driver assistance systems require vehicle-to-vehicle communication or vehicle-to-infrastructure communication. It is therefore necessary to provide antennas for the applicable communication services on the motor vehicle.

Antennas on motor vehicles may be realized as standalone electronic components that are mounted on or integrated in existing structures such as windows, exterior mirrors, spoilers or bumpers. Controllers providing a respective service are connected to the active antennas via radio-frequency lines in star form. As the number of communication services provided increases, the required number of antennas and the amount of radio-frequency wiring increase. This results in a high level of production outlay for the manufacture of the motor vehicle, increases the motor vehicle weight and needs additional installation space in the motor vehicle.

The document EP 0 924 864 A2 discloses a digital radio system having a multiplicity of modules. A digital signal processor is connected to the inputs and outputs, for example to antenna modules, via digital data connections.

A distributed architecture for receiving and sending RF signals is known from the document US 2014/0 044 026 A1. At the reception end, multiple RF signals can be combined to produce a multiplexed signal. This signal can subsequently be split into multiple information signals.

A method for digitally receiving a signal is known from the document WO 02/052 774 A2. A digital broadcast radio receiver in a vehicle includes a plurality of antennas and a number of receiver elements that corresponds to the number of antennas. An analog/digital converter of the respective receiver element is used to digitize the signal of the respective antenna directly.

The document US 2014/0 153 674 A1 relates to a distributed radio communication network. A first and a second gateway are each used to receive at least portions of data of a network node.

The document US 2014/0 243 033 A1 discloses a distributed antenna system. A device for routing data streams can combine data streams received via separate electrooptical converters to produce a transmission data stream that can be transmitted via an antenna device.

SUMMARY

Described below is a motor vehicle that is improved by comparison.

This is achieved by configuring the communication device to take an operating parameter of the communication device as a basis for selecting one or more of the antennas for sending the transmission information and/or for receiving the reception information, the number of antennas used by the communication service being variable over time.

It is therefore proposed to use a communication device that communicates digitally with the antenna circuits that perform the analog actuation of the antenna with a transmission signal on the basis of digital transmission data provided by the communication device, or perform the conversion of received signals received in analog form via the antenna into received data supplied to the communication device.

The communication device can itself provide communication services for a user. By way of example, input and/or output devices may be provided that the communication device uses to provide mobile radio services such as telephony, short message services, Internet access or the like. Additionally or alternatively, at least one communication service can be provided for further vehicle components. By way of example, communication services can be provided for a multimedia device, a mobile radio device configured separately from the communication device, a driver assistance system that uses vehicle-to-vehicle and/or vehicle-to-infrastructure communication and/or a navigation appliance that uses GPS data.

At least some of the multiple antennas may be arranged at intervals from one another. By way of example, multiple antennas may be arranged at intervals from one another on a vehicle roof and/or it is possible for antennas to be used in mirrors, on spoilers, on windows and/or on bumpers.

If a communication service is provided for further motor vehicle components, the communication by the motor vehicle component with the communication device can be effected such that the motor vehicle component provides useful data and optionally additional coding information to the communication device, after which the coding of the useful data for transmission by a transmission protocol based on the communication service is effected by the communication device and/or the antenna circuits involved. Alternatively, a motor vehicle component can also provide already coded data, however, wherein a digital representation of the transmission signal on an intermediate frequency or symbols or modulation signals for a modulation used as part of the transmission, in particular a quadrature amplitude modulation, can be used as coded data, for example.

The transmission data and/or received data can include the transmission information and/or received information in full or in part. In the communication device itself, a change in the coding is not necessarily effected on the transition from transmission information to transmission data or from received data to received information. The communication device can act as a kind of router that transmits provided transmission information as transmission data in full or in part to one or more of the antenna circuits, or collects received data from one or more of the antenna circuits and provides them as received information. In this case, the received data and transmission data can include, in addition to the transmission information or received information, protocol data that can be used for controlling the associated antenna circuit and/or the timing synchronization.

Alternatively, the communication device can also perform coding of transmission information into transmission data and decoding of received data into received information, for example digital modulation or demodulation of a carrier signal. The transmission information and/or the received information may essentially be useful data. The transmission data and received data can correspond to modulation signals for, or demodulated signals from, a quadrature amplitude modulation or to a digital representation of the transmission signal or of the received signal, in particular after a conversion to an intermediate frequency.

The antenna circuits can each include at least one analog/digital converter and/or at least one digital/analog converter, wherein the analog/digital converter is used to convert the received signal or a signal derived therefrom into the received data or digital received data elements in the received data, and wherein the digital/analog converter is used to convert the transmission data or transmission data elements in the transmission data into the transmission signal or into an analog preliminary signal convertible into the transmission signal by a subcircuit of the antenna circuit.

The transmission data and/or received data can additionally include protocol data besides the transmission data elements and/or received data elements. These protocol data can be used for the timing synchronization of the communication device with one or more antenna circuits and/or for the control of the respective antenna circuit. By way of example, a carrier frequency used as part of a modulation in the antenna circuit, a phase offset set by a phase shifter, the impedance of an impedance element and/or a gain factor of a signal amplifier of the antenna circuit can be controlled. At the reception end, time stamps can be provided as protocol data, for example.

In various embodiments of the motor vehicle, the received data and/or the transmission data can have different formats and the conversion into the transmission signals and/or received signals can be effected differently. A particularly simple design of the antenna circuit is possible if the received data and/or transmission data, or a portion thereof, transmitted are a digital representation of the transmission signal or of the received signal. The communication device and/or the motor vehicle component to which the communication service is provided perform the modulation of the transmission information and/or the demodulation of the received information completely in this case, and the antenna circuit is used exclusively for the digital/analog or analog/digital conversion of these signals. Therefore, a software radio is implemented, as result of which the usable transmission signals and received signals are limited exclusively by the programming of the communication device and/or of the further motor vehicle components, by the bandwidth of the communication channels for the received data and/or the transmission data and by the bandwidth of the analog/digital converter and/or the digital/analog converter.

The required bandwidth for the transmission data and/or received data can be reduced if a modulation of the transmission signal or a demodulation of the received signal is performed at least in part by the antenna circuit. The modulation and/or demodulation can be effected digitally. Alternatively, a modulation can be effected after digital/analog conversion and a demodulation can be effected before the analog/digital conversion. The digital/analog conversion and/or the analog/digital conversion can be effected at an intermediate frequency that is lower than the carrier frequency of the received signal or of the transmission signal. Such a frequency conversion is possible by virtue of multiplicative mixing of the analog preliminary signal or of the received signal with the carrier signal and optional subsequent filtering, for example.

If a quadrature amplitude modulation is used, then two digital/analog converters can be used in order to provide two separate analog preliminary signals, one of which is multiplicatively multiplied by a carrier signal having a first phase and the second of which is multiplicatively multiplied by a carrier signal at the same frequency having a phase shifted through 90°. At the reception end, a received signal can be converted into two derived signals by multiplicative mixing with carrier signals shifted through 90°, the derived signals being able to be captured by two analog/digital converters.

The communication device may be configured to generate the transmission data associated with one of the antenna circuits on the basis of various pieces of transmission information associated with the communication services and/or to provide received information associated with various instances of the communication services on the basis of received data associated with the antenna circuit. It is therefore possible to use each of one or more of the antennas for multiple communication services. Use of one antenna for multiple instances of the communication services can be effected such that the antenna is used for the various communication services at different times. However, it is also possible for the antenna to be used for multiple instances of the communication services essentially at the same time by virtue of a multiplexing method being used. By way of example, the multiplexing method used may be time division multiplexing, which involves changing over between reception and transmission for the various communication services at short intervals of time. However, it is also possible to perform frequency division multiplexing, which involves different carrier frequencies being used for the received signals and transmission signals associated with the various communication services.

However, it is also possible for multiplexing to be effected by the antenna circuit itself. By way of example, the antenna circuit can receive transmission data and send received data using multiple virtual addresses in a communication network by which it is connected to the communication device. Each of these virtual addresses can be used to provide a virtual antenna circuit for the communication device. Transmission data provided using multiple virtual addresses can be combined by the antenna circuit in order to generate a transmission signal. Received signals can be converted such that separate items of received data are provided for the individual communication services using the various virtual addresses.

The communication device may be configured to send transmission information associated with one of the communication services by generating respectively associated transmission data for various instances of the antenna circuits and transmitting the transmission data to the respectively associated antenna circuit, and/or by providing the received information associated with the communication service on the basis of the received data associated with the various antenna circuits. A service can thus send and/or receive via a plurality of the antennas.

The communication device may be configured so as, in a first mode of operation, to send all of the transmission information associated with the communication service via each of the antennas associated with the various antenna circuits and/or to receive all of the received information associated with the communication service via each of the antennas associated with the various antenna circuits. Sending and receiving of the transmission information and received information are therefore effected redundantly, which allows the robustness of the communication to be increased.

The communication device may be configured so as, in the first mode of operation, to generate each of the items of transmission data associated with the various antenna circuits such that the various antenna circuits generate identical transmission signals, apart from a respectively prescribed signal phase and signal amplitude. The signal amplitude and/or the signal phase may be the same for each of the antenna circuits. However, it is also possible for the signal amplitude and/or the signal phase to vary, for example in order to minimize phase cancelation for signals sent by different antennas. If a relative position of a receiver of the sent data is known, the signal amplitude and the signal phase can be set for each of the antenna circuits such that constructive interference occurs at the reception location. This is equivalent to what is known as beam forming in the transmission direction. The signal phase and/or the signal amplitude can be prescribed by the communication device or by the motor vehicle component providing the communication service. Alternatively or additionally, it is possible to generate each of the items of transmission data such that the transmission signal is sent by the antennas on different carrier frequencies and/or with different coding in order to allow redundant sending of the transmission information via various instances of the antennas.

Multiple methods in the known art allow an improvement in the robustness of the sending and receiving when the same information is redundantly sent and redundantly received via multiple antennas. Besides frequency diversity, which involves different transmission frequencies being used, and spatial diversity, which involves antennas at intervals from one another being used for sending or receiving, maximum ratio combining (MRC) at the reception end and what is known as the cyclic delay and space-time block code (STBC) method at the transmission end are relevant in particular. Maximum ratio combining involves the signals, which have been received via different antennas, being added, wherein the addition is effected in weighted fashion and the weighting factor is proportional to the signal-to-noise ratio of the signal received on the respective antenna.

The cyclic delay method involves the identical signal being supplied to multiple antennas, wherein different delay times are used for the signal, so that the signals radiated by the different antennas are phase shifted. A space-time block code likewise involves all the antennas used being used to send the same information all in all. The sending is effected in block-by-block fashion, however, wherein a transformation matrix is used to prescribe a different temporal rearrangement of the various blocks for the various antennas. The central provision of transmission data and the central combination of received data for multiple antennas make the cited methods for increasing robustness particularly easily implementable in the motor vehicle.

The communication device may be configured so as, in the first mode of operation, to combine the received data transmitted by the various antenna circuits such that it is equivalent to addition of the received signals converted by the various antenna circuits with prescribed weighting factors and a prescribed relative phase shift. This allows not only the MRC combining already explained but also what is known as digital beamforming to be implemented, the latter involving a defined directional dependency of the reception sensitivity of the antennas formed by the antennas when multiple antennas are used being able to be set by virtue of an appropriate combination of the received data.

The communication device may be configured so as, in a second mode of operation, to generate the transmission data associated with the various antenna devices on the basis of respectively different information elements of the transmission information and/or to ascertain respectively different portions of the received information from the received data associated with the various antenna devices and to provide the received information by combining these portions. This allows the data throughput of a communication to be increased by virtue of different antennas being used to send and receive different portions of the transmission information and of the received information. If both multiple transmission antennas and multiple reception antennas are used, this is also referred to in communications engineering as multiple input multiple output (MIMO).

The communication device may be configured to take at least one operating parameter of the communication device as a basis for automatically changing over between the first and second modes of operation. The operating parameter ascertained may be a reception strength, for example in the form of a signal-to-noise ratio, of a signal received from a communication partner, and if the reception quality is high, then the second mode of operation can be used, in which high communication speeds are reached. If it is ascertained that the reception strength is low, then the robustness of the communication can be increased by a change to the first mode of operation. However, it is also possible for the operating parameter to be prescribed by a motor vehicle component or depending on the service. By way example, multimedia services frequently require high data rates, and it is possible for relatively large buffer sizes to be used, so that it may be advantageous to use these in the second mode of operation. If the demands on the real time capability and reliability of a communication are high, however, for example if operation of a driver assistance system involves data being interchanged between various motor vehicles, then the first mode of operation can be used. It is also possible, in a further mode of operation, to combine the two approaches, that is to say to provide multiple antenna groups, the antennas each being used redundantly within one group and different groups sending different information elements of the transmission information and providing different information elements of the received information.

At least one of the antenna circuits can be used to provide various types of transmission signals and/or to convert various types of received signals into the received data, wherein the various types of transmission signals and/or received signals have different carrier frequencies and/or signal codings, wherein the communication device is used to control the antenna circuit to select the carrier frequency and/or the signal coding on the basis of an operating parameter of the communication device. The carrier frequency and/or the signal coding can in particular be matched on the basis of which of the communication services is currently communicating via the antenna.

The communication device is configured to take at least one operating parameter of the communication device as a basis for selecting one or more antennas for sending the transmission information and/or for receiving the received information. The operating parameter may be the utilization level of one or more of the antennas, the communication service used and hence, by way of example, a frequency band used, a connection quality required for a communication service or a priority of the communication service or of the received information to be received and/or of the transmission information to be sent.

For at least one of the communication services, the number of antennas used by the communication service is variable over time. If only one communication service is used, for example, all the antennas or all the antennas that are suitable for communication using the applicable communication service can be used for communication. If a further communication service is requested by the user or a motor vehicle component, the number of antennas used by the communication service can be reduced in order to allow communication by the further communication service, or some or all of the antennas can be used by both communication services together.

The antenna circuit can have a variable impedance via which the transmission signal is able to be supplied to the antenna and/or the received signal is captured from the antenna, wherein the communication device is used to control the antenna circuit to alter the impedance. In the case of the motor vehicle described herein, antennas may be usable for multiple communication services. In order to allow efficient sending or receiving of signals, however, it is necessary to match an antenna to the frequencies to be received or the frequencies to be sent. In many cases, the antenna can be tuned by matching an impedance. A variable impedance can be realized by virtue of capacitors and/or resistances being connected in the signal path or between the signal path and a ground potential, for example.

The antenna circuits and the communication device may be configured for operation with synchronous timing. The timing synchronization can be effected by virtue of the antenna circuits and the communication device being supplied with a common clock signal. It is also possible to use internal timings of the antenna circuits and the communication device, which are synchronized by synchronization signals interchanged within the framework of the transmission data and/or the received data or separately therefrom. Timing synchronization between the antenna circuits and the communication device allows defined phase relationships between the transmission signals or the received signals to be stipulated or ascertained.

The motor vehicle can have a communication network, wherein multiple instances of the antenna circuits are connected to the communication device via the communication network in order to transmit the transmission data and/or the received data. The network can also be used for timing synchronization of the antenna circuits and the communication device, for example by virtue of defined timing synchronization packets being transmitted via the network.

BRIEF DESCRIPTION OF THE DRAWINGS

These and other aspects, advantages and details will become more apparent and more readily appreciated from the following description of the exemplary embodiments that follow and the associated drawings, in which, schematically.

DETAILED DESCRIPTION OF THE PREFERRED EMBODIMENT

Figure 1:
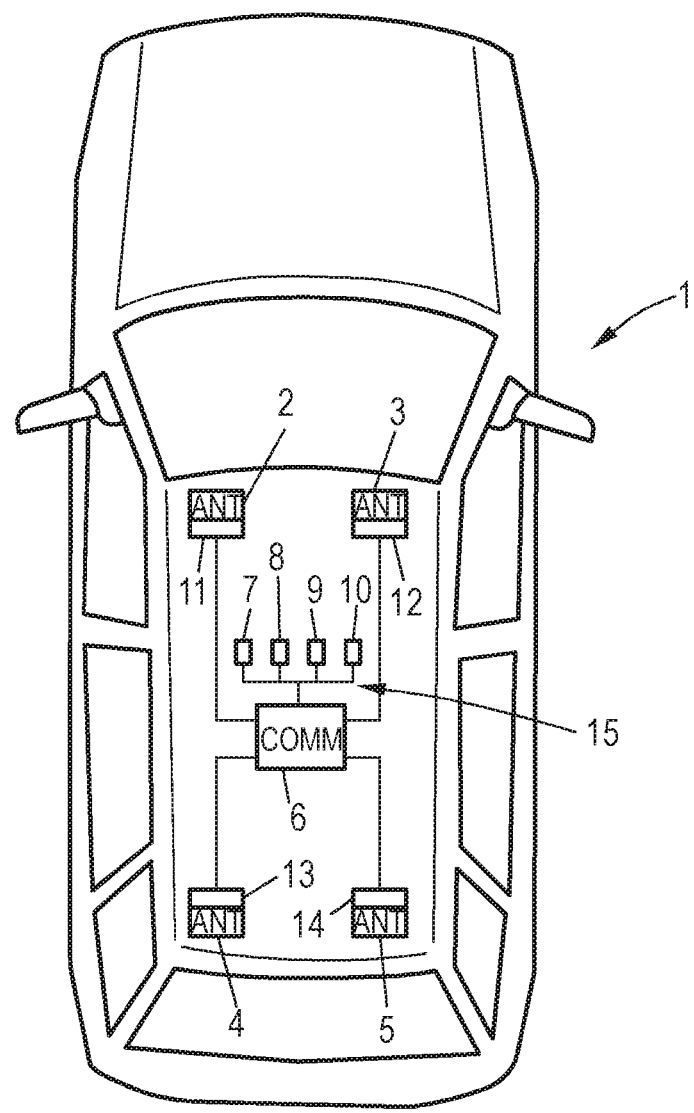
FIGS. 1 and 2 are block diagrams superposed on plan views of exemplary embodiments of two motor vehicles, respectively.

Reference will now be made in detail to the preferred embodiments, examples of which are illustrated in the accompanying drawings, wherein like reference numerals refer to like elements throughout.

FIG. 1 shows a motor vehicle 1 having multiple antennas 2, 3, 4, 5 and a communication device 6. The communication device 6 provides the further motor vehicle components 7, 8, 9, 10, a mobile radio device, a radio receiver, a control device of a driver assistance system, which control device is configured for vehicle-to-vehicle communication, and a navigation appliance that receives GPS data, with respective communication services that are used for receiving a piece of received information and for sending a piece of transmission information via the antennas 2, 3, 4, 5. Each of the antennas 2, 3, 4, 5 has an associated antenna circuit 11, 12, 13, 14. These are each used for converting an analog received signal received from the antenna 2, 3, 4, 5 into digital received data associated with the respective antenna circuit 11, 12, 13, 14, and digital transmission data associated with the respective antenna circuit 11, 12, 13, 14 into an analog transmission signal supplied to the associated antenna 2, 3, 4, 5. The communication device 6 is configured to send transmission information by generating transmission data on the basis of the transmission information and transmitting the transmission data to the antenna circuit 11, 12, 13, 14 associated with the respective transmission data, and to receive a piece of received information by receiving respective received data from the antenna circuits 11, 12, 13, 14 and providing the piece of received information on the basis of the received data. The motor vehicle components 7, 8, 9, 10 communicate with the communication device 6 via a vehicle bus 15, for example a CAN bus.

Figure 2:
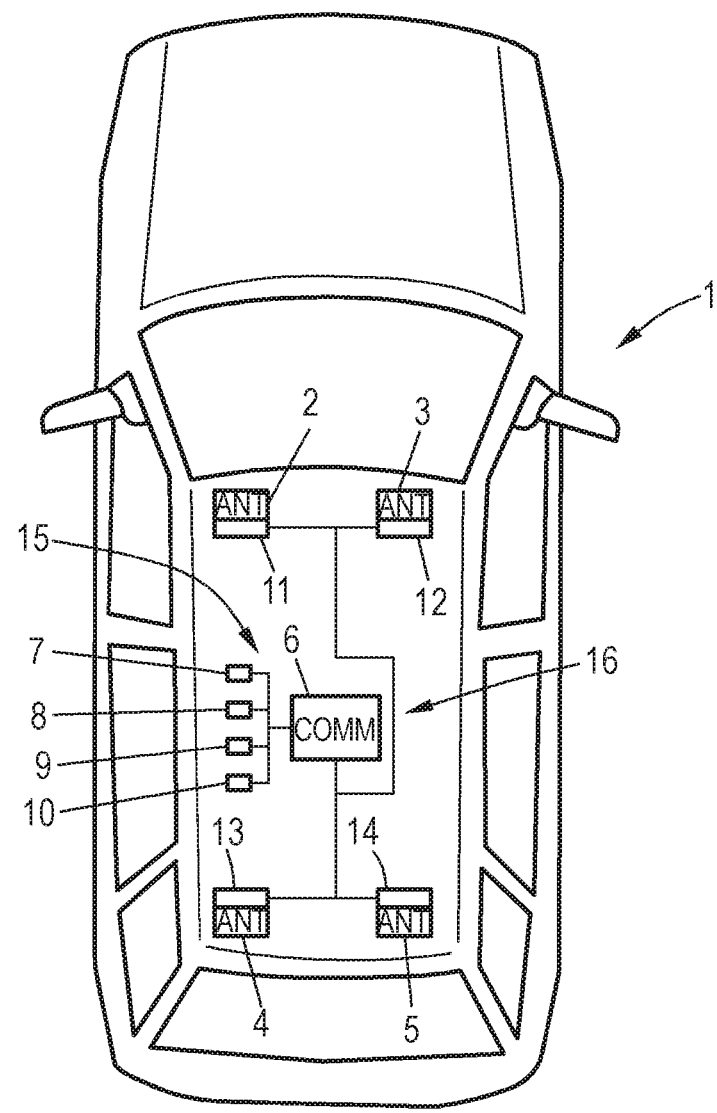

FIG. 2 shows a further exemplary embodiment of a motor vehicle 1 having multiple antennas 2, 3, 4, 5. The operation of the components shown largely corresponds to that of the components shown in FIG. 1, for which reason the components have been denoted using the same reference symbols. Fundamental difference in the motor vehicle 1 depicted in FIG. 2 from the motor vehicle 1 depicted in FIG. 1 is that the antenna circuits 11, 12, 13, 14 use the communication network 16 to communicate with the communication device 6. In contrast to the star-shaped connection of the antenna circuits 11, 12, 13, 14 to the communication device 6, the communication network 16 allows simpler and more flexible wiring. The communication network 16 is used for transmitting the received data and the transmission data for the antenna circuits 11, 12, 13, 14. Additionally, synchronization information for the communication network 16 is transmitted that allows timing synchronization of the communication device 6 with the antenna circuits 11, 12, 13, 14. The communication network 16 can use an Ethernet protocol. The data transmission can be effected according to the low voltage differential signal (LVDS) standard.

Figure 3:
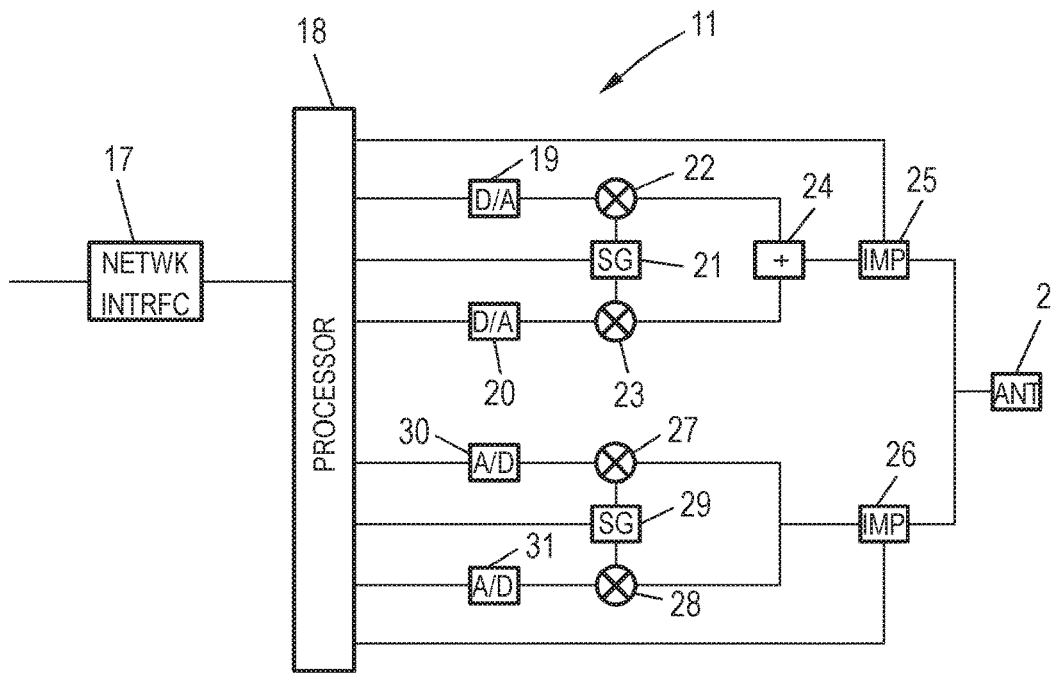
FIG. 3 is a block diagram of an antenna circuit of the motor vehicle shown in FIG. 2.

FIG. 3 schematically shows the structure of the antenna circuit 11. The antenna circuit 11 is connected to the communication network 16 via a network interface 17. This network interface 17 implements network functions and allows the antenna circuit 11 to be addressed via the communication network 16 using a prescribed address. Data received by the network interface 17 are supplied to the processing device 18, which may be a programmed microcontroller or an application-specific circuit, for example. If the received data are transmission data that are supposed to initiate its sending of a transmission signal via the antenna 2, then protocol data transmitted with the transmission data are first of all evaluated in order to ascertain configuration information for the antenna circuit 11. This configuration information is used firstly to match the variable impedances 25, 26 and secondly to start the signal generators 21, 29 for the carrier signal or the demodulation signal with a defined frequency and a defined phase.

In the antenna circuit 11 shown, a quadrature amplitude modulation is used for modulation. Therefore, the transmission data to be sent are distributed over two channels, the signals of which are converted into an analog preliminary signal separately by the two digital/analog converters 19, 20. The analog preliminary signal is multiplicatively mixed with the carrier signal provided by the signal generator 21 in each of the multiplicative mixers 22, 23. The signal generator provides the mixer 22 with a modulation signal having a first prescribed phase and provides the mixer 23 with a signal shifted through 90° by comparison. The output signals of the mixers 22, 23 are added using the analog adder 24 and are supplied to the antenna 2 via the variable impedance 25.

A received signal received at the antenna 2 is supplied to the mixers 27, 28 via the variable impedance 26. A signal generator 29 is used to supply a signal having a defined phase and the carrier frequency of the received signal to the mixer 27 and supply a signal phase shifted through 90° by comparison to the mixer 28. As a result of this mixing with the carrier signal and filtering, not shown, the normal components (I) and the quadrature components (Q) of the received signal are each down-converted to baseband and subsequently converted by the analog/digital converters 30, 31. In the processing device 18, the converted data are combined and are transmitted to the communication device 6 as received data via the network interface 17. The received data are provided with a time stamp in order to allow correlation with signals received from further antennas 3, 4, 5.

Figure 4:
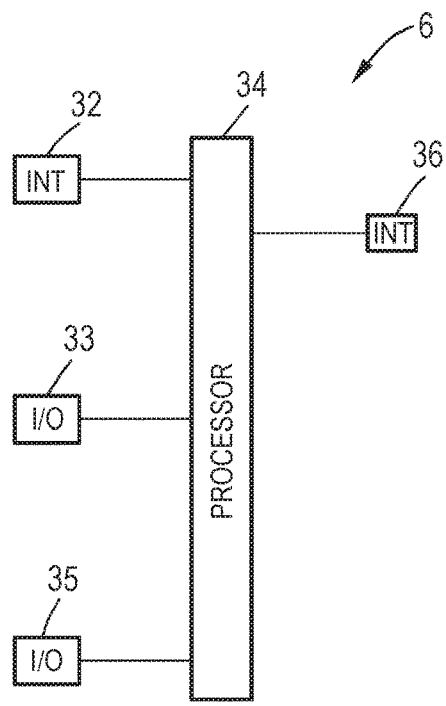
FIG. 4 is a block diagram of a communication device of the motor vehicle shown in FIG. 2.

FIG. 4 shows the structure of the communication device 6 of the motor vehicle shown in FIG. 2. To provide communication services, the communication device 6 has an interface 32 for the vehicle bus 15, for example a CAN bus, which the further motor vehicle components 7, 8, 9, 10 can use to communicate with the communication device 6 in order to use the communication services. In addition, the communication device has an input/output interface 33 that can be used to connect communication-device-specific inputs and outputs to the communication device. By way of example, a converter for an audio input and output can be provided in order to allow telephony functions by the communication device itself or the like. A processing device 34 associates the various antennas 2, 3, 4, 5 and hence the antenna circuits 11, 12, 13, 14 with the various services. The association is made dynamically and such that firstly one antenna is able to be used by multiple services, wherein a multiplexing method is used, and secondly a service can use multiple antennas in order to achieve higher data rates, greater robustness for the communication and/or interaction of antennas to prescribe a directionally dependent transmission power or reception sensitivity by beam forming.

If multiple antennas are used by one communication service, then it is possible, in a first mode of operation, for all the transmission information transmitted by the service to be transmitted via all the associated antennas. In a second mode of operation, each of the antennas transmits only information elements of the transmission information. The association between the antennas and the services is made on the basis of a priority of the services that is firmly prescribed for the motor vehicle 1, a reception strength at the remote station that is ascertained for the respective service and a utilization level of the antennas 2, 3, 4, 5 by the communication services. After the association of the antennas, the processing apparatus 34 generates transmission data records for each of the antenna circuits 11, 12, 13, 14 associated with the antennas 2, 3, 4, 5, or receives received data records from the antenna circuits, in order to send the transmission information, or to ascertain the received information. The data transmission to and from the antenna circuits 11, 12, 13, 14 is effected via a network interface 36. The network interface 36 is moreover used to send synchronization messages to the antenna circuits 11, 12, 13, 14. For this, the communication device 6 includes a central clock generator 35.

Figure 5:
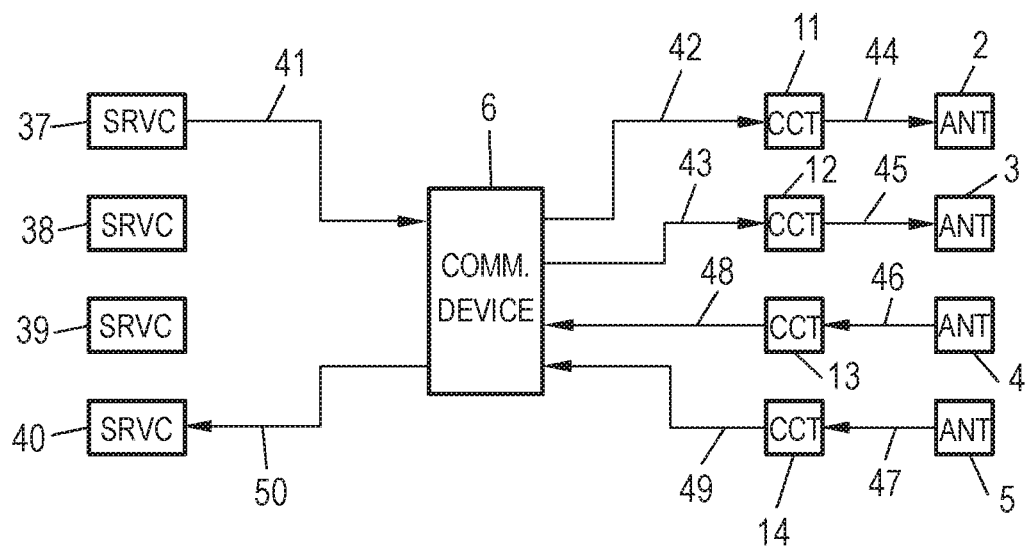
FIGS. 5 and 6 are block diagrams of examples of multiple antennas for multiple communication services in the motor vehicle shown in FIG. 2.
Figure 6:
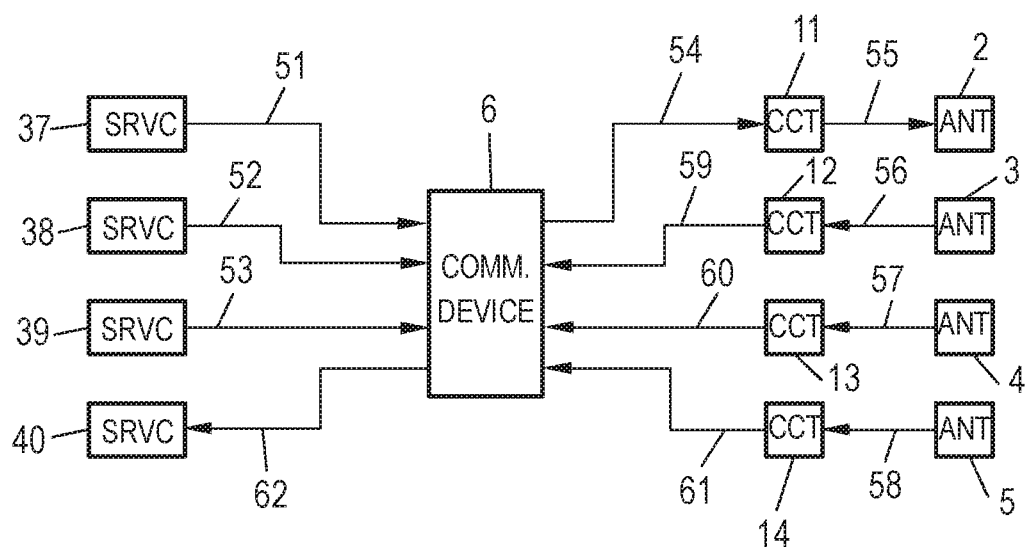

FIGS. 5 and 6 schematically show how transmission information of various communication services 37, 38, 39, 40 is distributed over the antenna circuits 11, 12, 13, 14 and hence over the antennas 2, 3, 4, 5 via the communication device 6, and how received information for the communication services 37, 38, 39, 40 is ascertainable from received data of the antenna circuits 11, 12, 13, 14. Purely by way of example, two operating states are shown. In the first operating state, shown in FIG. 5, transmission information 41 needs to be sent via a service 37 and received information 50 needs to be received via a further communication service 40. Two antennas 2, 3, 4, 5 are used in each case both for sending the transmission information 41 using the communication service 37 and by the receiving of the received information 50 by the communication service 40. The communication service 37 is a vehicle-to-vehicle communication that is used as part of a driver assistance system, which is why a high level of robustness for the communication is desired. Therefore, the transmission information 41 is transmitted completely via the antennas 2, 3 in each case. The communication device 6 therefore ascertains transmission data 42, 43 that are converted by the antenna circuits 11, 12 into identical transmission signals 44, 45, which have a phase offset, however, in order to reduce signal cancellations.

The communication service 40 is reception of multimedia information. In order to achieve a higher data throughput, the data are received as received signals 46, 47 via the antennas 4, 5 such that the received data 48, 49 transmitted to the communication device 6 via the antenna circuits 13, 14 each describe only a portion of received information 50, after which these portions are combined in the communication device 6 to produce the received information 50.

FIG. 6 shows a further operating situation in which a further-increased data throughput needs to be achieved for the communication service 40, for which reason the antenna 3 is now additionally used as a reception antenna. Therefore, the received signals 56, 57, 58 are converted into the received data 59, 60, 61, from which the received information 62 is ascertained in the communication device 6 and provided for the communication service 40. In this operating state, the communication services 37, 38, 39 all send at a low data rate and with low required robustness. Hence, exclusively antenna 2 is used for the communication services 37, 38, 39, the antenna being operated in multiplex mode in order to send the transmission signal 55. This involves a time-division multiplexing method being used in which the communication services 37, 38, 39 alternately send via the antenna 2. The transmission data 54 supplied to the antenna circuit 11 therefore include, in successive time windows, transmission data 54 that are generated on the basis of the transmission information 51, 52, 53 of the communication services 37, 38, 39.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A motor vehicle, comprising:
   at least one motor vehicle component;
   antennas;
   antenna circuits respectively connected to the antennas; and
   at least one communication device connected to the antenna circuits and configured
      to provide at least one communication service for at least one of sending transmission information associated with the at least one communication service and receiving reception information associated with the at least one communication service via at least one of the antennas for at least one of a user and the at least one motor vehicle component, each of the antennas associated with a respective antenna circuit, among the antenna circuits, converting at least one of an analog received signal received from the antenna associated therewith into digital received data associated with the respective antenna circuit and digital transmission data associated with the respective antenna circuit into an analog transmission signal supplied to the antenna associated therewith,
      to send the transmission information by generating the digital transmission data associated with at least one antenna circuit based on the transmission information and transmitting the digital transmission data to the at least one antenna circuit,
      to receive a piece of the reception information by receiving the digital received data from the at least one antenna circuit and providing the reception information based on the digital received data, and
      to take an operating parameter of the communication device as a basis for selecting at least one of the antennas for at least one of sending the transmission information and receiving the reception information with the number of antennas used by the at least one communication service being variable over time.

2. The motor vehicle as claimed in claim 1, wherein the antenna circuits each comprise at least one of
   at least one analog/digital converter configured to convert one of the analog received signal and another signal derived therefrom into one of the digital received data and digital received data elements included in the digital received data; and
   at least one digital/analog converter configured to convert one of the digital transmission data and transmission data elements included in the digital transmission data into one of the analog transmission signal and an analog preliminary signal convertible into the analog transmission signal by a subcircuit of the antenna circuit.

3. The motor vehicle as claimed in claim 2, wherein the at least one communication device is configured to at least one of
   generate the digital transmission data associated with the respective antenna circuit based on various pieces of the transmission information associated with the at least one communication service and
   provide the reception information associated with various instances of the at least one communication service based on the digital received data associated with the respective antenna circuit corresponding thereto.

4. The motor vehicle as claimed in claim 3, wherein the at least one communication device is configured to at least one of
   send the transmission information associated with the at least one communication service by generating the digital transmission data respectively associated with various instances of the antenna circuits and transmitting the digital transmission data to the various instances of the antenna circuits respectively associated therewith, and
   provide the received information associated with the at least one communication service based on the digital received data associated with the various instances of the antenna circuits.

5. The motor vehicle as claimed in claim 4, wherein the at least one communication device is configured to have a first mode of operation to at least one of
   send all of the transmission information associated with the at least one communication service via each of the antennas and the respective antenna circuit associated therewith, and
   receive all of the received information associated with the at least one communication service via each of the antennas and the respective antenna circuit associated therewith.

6. The motor vehicle as claimed in claim 5, wherein the at least one communication device is configured to generate, in the first mode of operation, each item of the digital transmission data associated with the various instances of the antenna circuits such that the various instances of the antenna circuits each generate identical transmission signals, apart from a respectively prescribed signal phase and signal amplitude.

7. The motor vehicle as claimed in claim 6, wherein the at least one communication device is configured to combine, in the first mode operation, the digital received data transmitted by the various antenna circuits such that it is equivalent to addition of the analog received signal converted by each of the various instances of the antenna circuits with prescribed weighting factors and a prescribed relative phase shift.

8. The motor vehicle as claimed in claim 7, wherein the at least one communication device is configured to perform, in a second mode of operation, at least one of
generating the digital transmission data associated with the respective antenna circuit based on respectively different information elements of the transmission information, and
ascertaining respectively different portions of the reception information from each item of the digital received data associated with the respective antenna circuit and providing the reception information by combining the respectively different portions.

9. The motor vehicle as claimed in claim 8, wherein the at least one communication device is configured to take at least one operating parameter of the at least one communication device as a basis for automatically changing between the first and second modes of operation.

10. The motor vehicle as claimed in claim 1, wherein the at least one communication device is configured to at least one of
generate the digital transmission data associated with the respective antenna circuit based on various pieces of the transmission information associated with the at least one communication service and
provide the reception information associated with various instances of the at least one communication service based on the digital received data associated with the respective antenna circuit corresponding thereto.

11. The motor vehicle as claimed in claim 1, wherein the at least one communication device is configured to at least one of
send the transmission information associated with the at least one communication service by generating the digital transmission data respectively associated with various instances of the antenna circuits and transmitting the digital transmission data to the various instances of the antenna circuits respectively associated therewith, and
provide the received information associated with the at least one communication service based on the digital received data associated with the various instances of the antenna circuits.

12. The motor vehicle as claimed in claim 11, wherein the at least one communication device is configured to have a first mode of operation to at least one of
send all of the transmission information associated with the at least one communication service via each of the antennas and the respective antenna circuit associated therewith, and
receive all of the received information associated with the at least one communication service via each of the antennas and the respective antenna circuit associated therewith.

13. The motor vehicle as claimed in claim 12, wherein the at least one communication device is configured to generate, in the first mode of operation, each item of the digital transmission data associated with the various instances of the antenna circuits such that the various instances of the antenna circuits each generate identical transmission signals, apart from a respectively prescribed signal phase and signal amplitude.

14. The motor vehicle as claimed in claim 12, wherein the at least one communication device is configured to combine, in the first mode operation, the digital received data transmitted by the various antenna circuits such that it is equivalent to addition of the analog received signal converted by each of the various instances of the antenna circuits with prescribed weighting factors and a prescribed relative phase shift.

15. The motor vehicle as claimed in claim 11, wherein the at least one communication device is configured to perform, in a second mode of operation, at least one of
generating the digital transmission data associated with the respective antenna circuit based on respectively different information elements of the transmission information, and
ascertaining respectively different portions of the reception information from each item of the digital received data associated with the respective antenna circuit and providing the reception information by combining the respectively different portions.

16. The motor vehicle as claimed in claim 15, wherein the at least one communication device is configured to take at least one operating parameter of the at least one communication device as a basis for automatically changing between the first and second modes of operation.

17. The motor vehicle as claimed in claim 1,
wherein at least one of the antenna circuits at least one of
provides various types of transmission signals and
converts various types of received signals into the digital received data, at least one of the various types of the transmission signals and the received signals having at least one of different carrier frequencies and different signal codings, and
wherein the at least one communication device controls the at least one of the antenna circuits to select at least one of a carrier frequency and a signal coding based on at least one operating parameter of the at least one communication device.

18. The motor vehicle as claimed in claim 1,
wherein at least one of the antenna circuits has a variable impedance via which at least one of the analog transmission signal is supplied to the antenna associated therewith and the analog received signal is captured from the antenna associated therewith, and
wherein the at least one communication device controls the at least one of the antenna circuits to alter the impedance.

19. The motor vehicle as claimed in claim 1, wherein the antenna circuits and the at least one communication device are configured for operation with synchronous timing.

20. The motor vehicle as claimed in claim 1,
further comprising a communication network,
wherein multiple instances of the antenna circuits are connected to the at least one communication device via the communication network to perform at least one of transmitting the digital transmission data and receiving the digital received data.

* * * * *